(12) United States Patent
Yim et al.

(10) Patent No.: US 7,757,243 B2
(45) Date of Patent: Jul. 13, 2010

(54) OPTICAL DISC DRIVE WITH MECHANISM TO REDUCE TRAY VIBRATION

(75) Inventors: Hong Kyun Yim, Suwon-si (KR); Yong Hoon Lee, Suwon-si (KR); Jae Yong Eum, Suwon-si (KR); Jeung Rak Lee, Suwon-si (KR)

(73) Assignee: Samsung Electronics Co. Ltd, Suwon-si (KR)

( * ) Notice: Subject to any disclaimer, the term of this patent is extended or adjusted under 35 U.S.C. 154(b) by 1020 days.

(21) Appl. No.: 11/493,813

(22) Filed: Jul. 27, 2006

(65) Prior Publication Data
US 2007/0050788 A1    Mar. 1, 2007

(30) Foreign Application Priority Data
Aug. 30, 2005  (KR) .................. 10-2005-0079906

(51) Int. Cl.
*G11B 17/04* (2006.01)
(52) U.S. Cl. ..................................... 720/613
(58) Field of Classification Search .......... 720/601, 720/610, 611, 613
See application file for complete search history.

(56) References Cited

U.S. PATENT DOCUMENTS

| 2003/0117928 | A1* | 6/2003 | Choi et al. ............ 369/75.2 |
| 2004/0143837 | A1* | 7/2004 | Kim ....................... 720/611 |
| 2005/0188389 | A1 | 8/2005 | Namiki |
| 2005/0198653 | A1* | 9/2005 | Chen ...................... 720/601 |
| 2005/0223397 | A1* | 10/2005 | Arase ..................... 720/601 |

FOREIGN PATENT DOCUMENTS

KR    2004-46270    11/2002

OTHER PUBLICATIONS

Office Action issued in corresponding Chinese Patent Application No. 2006101000682 dated Jan. 23, 2009.
Search Report issued on Jan. 24, 2007 by the European Patent Office for European Patent Application No. 06115963.8-2210.

* cited by examiner

*Primary Examiner*—Craig A. Renner
*Assistant Examiner*—Tamara Ashford
(74) *Attorney, Agent, or Firm*—Stanzione & Kim LLP

(57) ABSTRACT

An optical disc drive, including a main frame a tray disposed such that the tray is to be inserted into or ejected from the main frame to load or unload a disc and a tray holding unit to press bias the tray, when the loading/unloading of the tray is completed, so as to restrict the vertical and lateral movement of the tray when the loading/unloading of the tray is completed.

15 Claims, 12 Drawing Sheets

OPTICAL DISC DRIVE WITH MECHANISM TO REDUCE TRAY VIBRATION

CROSS-REFERENCE TO RELATED APPLICATIONS

This application claims the benefit of Korean Patent Application No. 2005-79906, filed Aug. 30, 2005 in the Korean Intellectual Property Office, the disclosure of which is incorporated herein by reference.

BACKGROUND OF THE INVENTION

1. Field of the Invention

Aspects of the present invention relate to an optical disc drive, and, more particularly, to an optical disc drive that is capable of preventing shaking of a tray, thereby minimizing vibration and noise generated from the tray.

2. Description of the Related Art

Generally, an optical disc drive is an apparatus that irradiates light to a disc-shaped optical medium (hereinafter, referred to as a "disc"), such as a compact disc (CD), a digital versatile disc (DVD), or a blu-ray disc (BD), to record data to the disc or reproduce data from the disc.

FIG. 1 is a perspective view schematically illustrating a conventional optical disc drive, and FIG. 2 is a sectional view taken along line I-I of a part "A" of FIG. 1 when a tray is inserted in a main frame. As shown in FIG. 1, the conventional optical disc drive includes a main frame 1 and a tray 2, which may be disposed such that the tray 2 is inserted into or ejected from the main frame 1 while a disc is loaded on the tray 2. The tray 2 is slid into the main frame 1 or ejected from the main frame 1 by the cooperation of a loading motor and a pinion gear mounted at the front part of the main frame 1 and a rack gear mounted at the lower surface of the tray 2.

Guide rails 3 to guide the sliding movement of the tray 2 and protrusions 4 are provided at opposite sides of the main frame 1, as shown in FIGS. 1 and 2. The guide rails 3 protrude to a predetermined height from opposite side parts of the bottom surface of the main frame 1. The guide rails 3 are fitted in guide grooves 5 formed at the lower surface of the tray 2 to correspond in location to that of the guide rails 3 to prevent the tray from shaking from side to side when the tray 2 is slid. As shown in FIG. 1, a plurality of guide rails 3 may be arranged in the direction in which the tray 2 is slid.

The protrusions 4 horizontally protrude a predetermined length from the inner surfaces of the opposite sides of the main frame 1. As shown in FIG. 2, the protrusions 4 are positioned above the opposite side ends of the tray 2 to prevent the tray 2 from shaking up and down when the tray 2 is slid. Like the guide rails 3, a plurality of protrusions 4 may be also arranged in the direction in which the tray 2 is slid.

As is described above, the lateral and vertical shaking of the tray 2 is effectively prevented by the guide rails 3 and the protrusions 4. The conventional optical disc drive is designed such that predetermined gaps are provided between the guide rails 3 and the guide grooves 5 and between the protrusions 4 and the upper surface of the tray 2 to minimize friction generated when the tray 2 is slid.

When the disc is recorded/reproduced, however, noise is generated due to the gaps. When the disc is rotated, vibration is generated, and the vibration is transmitted to the tray 2. As a result, the tray 2 may shake up and down or from side to side, and therefore, the tray 2 may collide with the guide rails 3 or the protrusions 4. This problem is increased as high-speed recording/reproducing technology is advanced (for example, 52-X for CDs and 16-X for DVDs).

To solve the above-mentioned and/or other problems, an optical disc drive having additional holders to prevent shaking of the tray has been proposed. FIG. 3 illustrates such an optical disc drive. A plurality of holders 6 are mounted at a cover 7, which covers the top of the tray 2, to press the edge of the upper surface of the tray 2 when the disc is loaded/unloaded and when the disc is recorded/reproduced. To this end, each of the holders has a spring 6a and a pressing member 6b to press the edge of the upper surface of the tray 2 by the elastic force of the spring 6a.

The holders 6 prevent shaking of the tray when the disc is recorded/reproduced. However, the holders press the tray 2 even when the tray is slid to load/unload the disc. As a result, friction between the components is increased when the tray 2 is slid, and therefore, a large load is applied to the loading motor.

SUMMARY OF THE INVENTION

Therefore, it is an aspect of the invention to provide an optical disc drive that is capable of restricting the lateral and vertical movement of a tray when a loading operation of the tray is completed to minimize vibration and noise generated when the disc is recorded/reproduced. It is another aspect of the invention to provide an optical disc drive that is capable of preventing a large load from being applied to a loading motor. It is yet another aspect of the invention to provide an optical disc drive that is capable of preventing shaking of the tray when an unloading operation of the tray is completed.

In accordance with one aspect, the present invention provides an optical disc drive, comprising: a main frame; a tray to be inserted into or ejected from the main frame to load or unload a disc; and a tray holding unit to bias the tray so as to restrict the vertical and lateral movement of the tray when the loading/unloading of the tray is completed.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
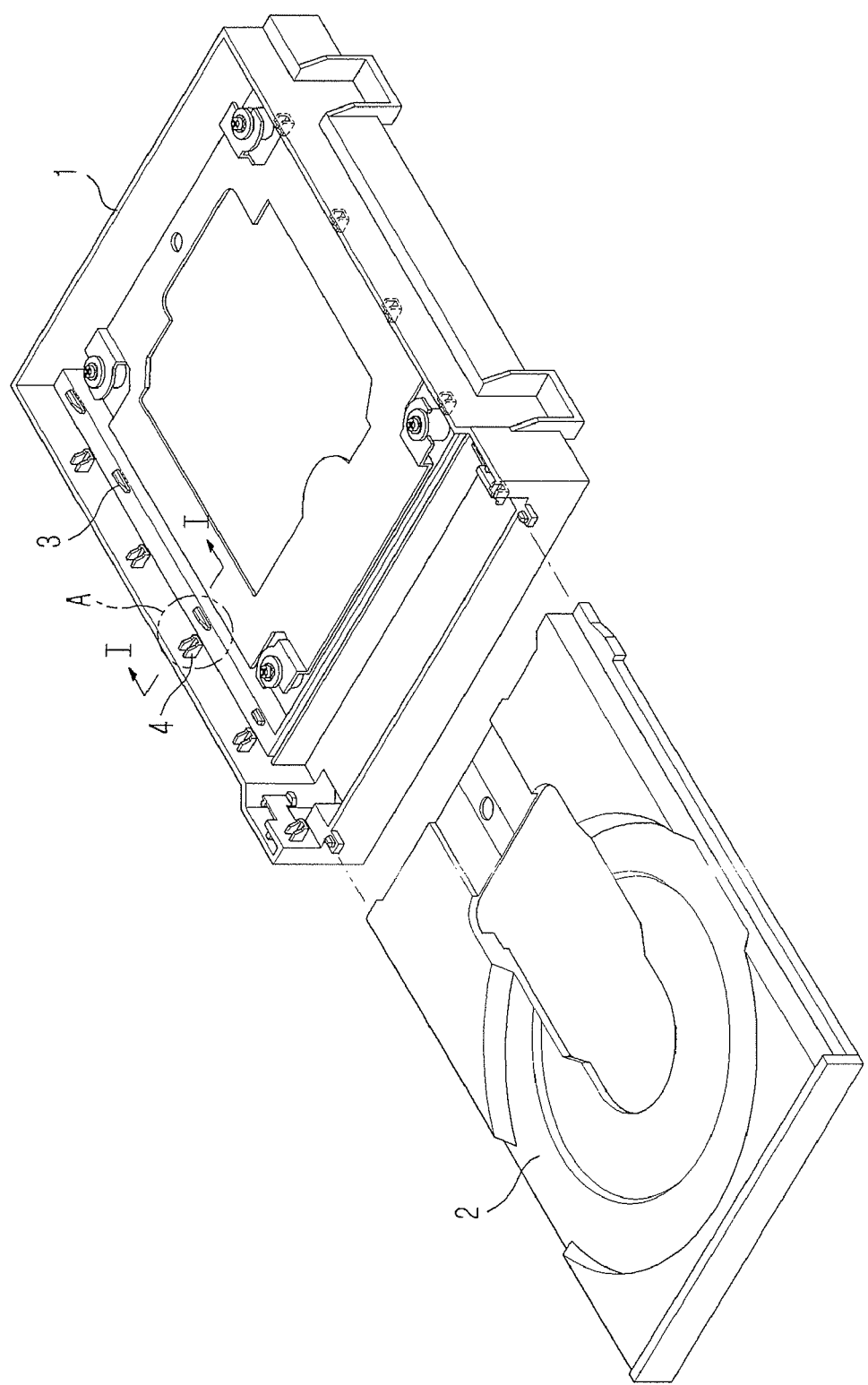
FIG. 1 is a perspective view schematically illustrating a conventional optical disc drive.
Figure 2:
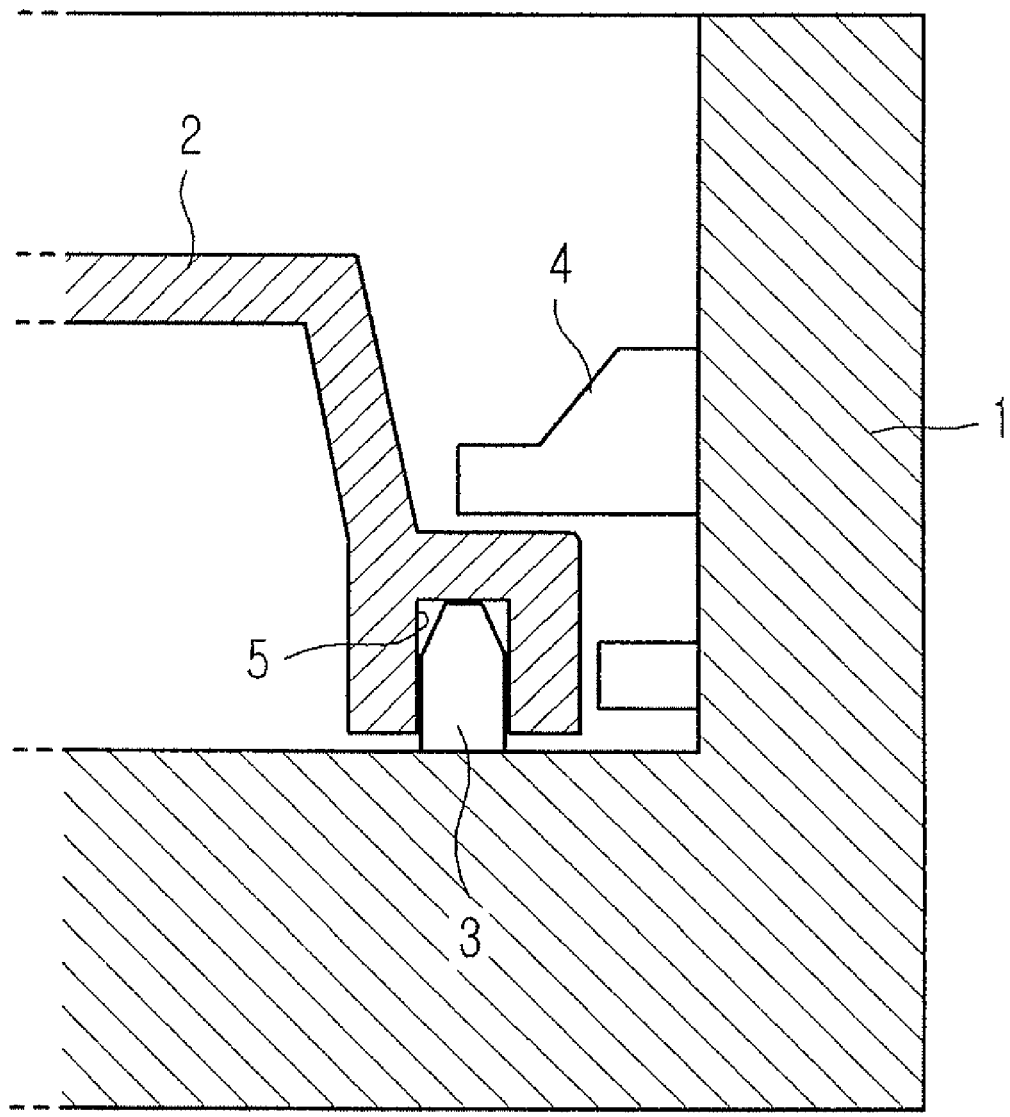
FIG. 2 is a sectional view taken along line I-I of a part "A" of FIG. 1 when a tray is inserted in a main frame.
Figure 3:
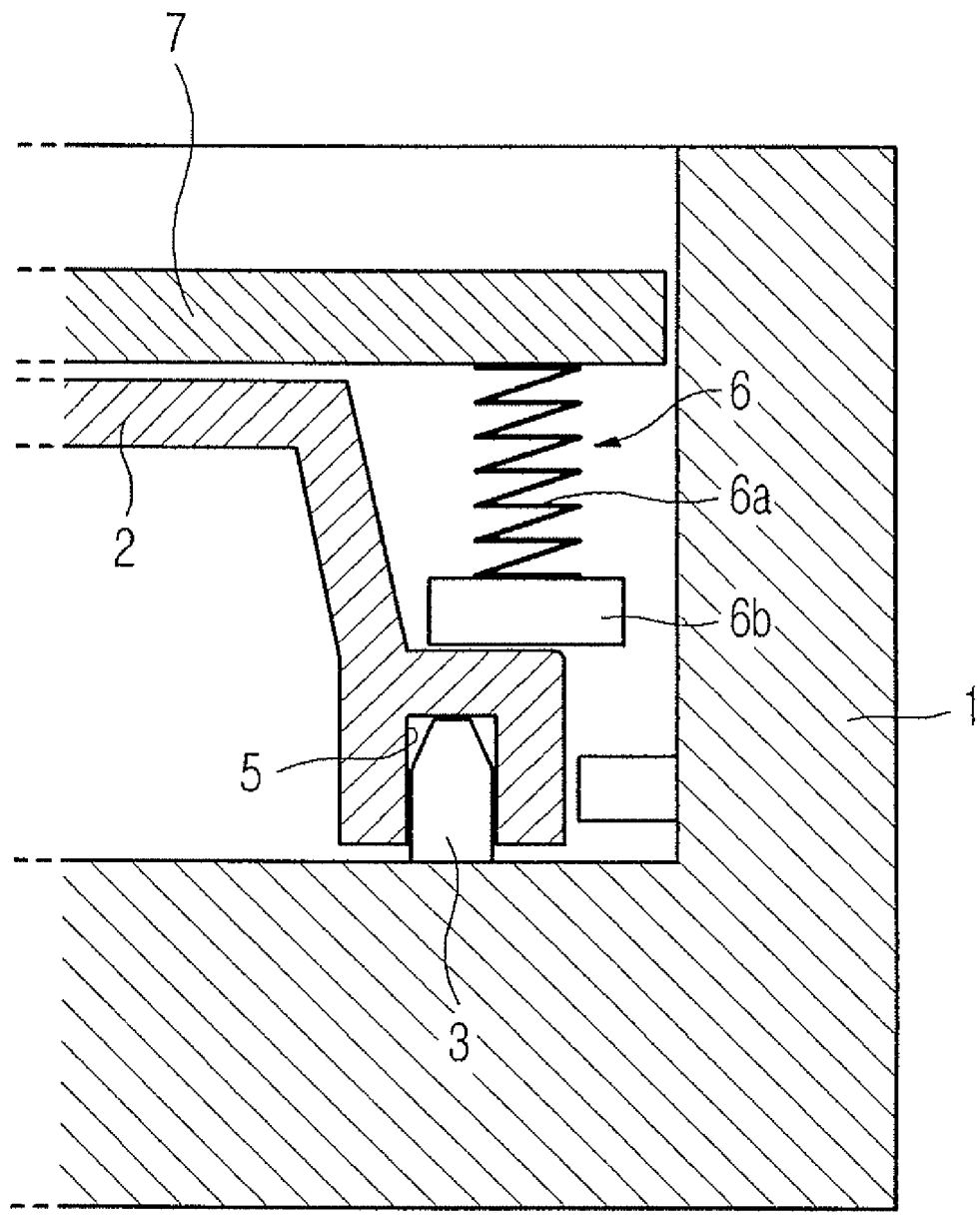
FIG. 3 is a sectional view illustrating another conventional optical disc drive.

Reference will now be made in detail to the embodiment of the present invention, examples of which are illustrated in the accompanying drawings, wherein like reference numerals refer to like elements throughout. The embodiments are described below to explain the present invention by referring to the figures.

Figure 4:
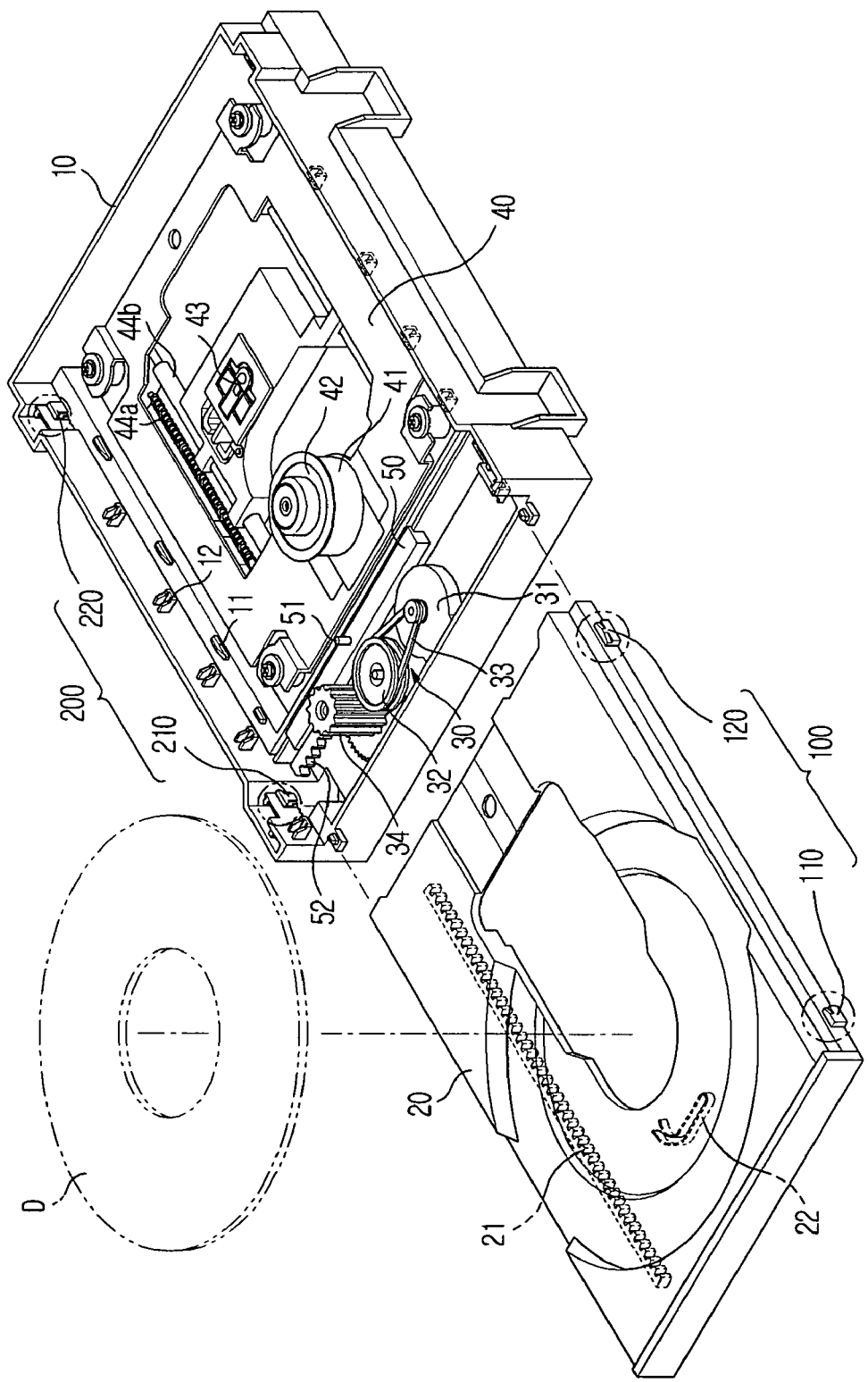
FIG. 4 is a perspective view illustrating the structure of an optical disc drive according to an embodiment of the present invention.

FIG. 4 is a perspective view illustrating the structure of an optical disc drive according to the present invention. As shown in FIG. 4, the optical disc drive includes a main frame 10 and a tray 20, which is disposed such that the tray 20 is inserted into or ejected from the main frame 10 to load or unload a disc D. The tray 20 is slid through the front part, which is open, of the main frame 10 to perform a loading/unloading operation.

A loading unit 30 to provide power necessary to slide the tray 20 is mounted at a bottom surface of the front part of the main frame 10. The loading unit 30 includes a loading motor 31, and a pulley 32, a belt 33, and a pinion gear 34, which transmit power of the loading motor 31 to the tray 20. A rack gear 21, which is connected to a pinion gear 34 so as to linearly reciprocate the tray 20, is disposed at one side of the lower surface of the tray 20.

A chassis 40, at which various components for recording/reproduction of the disc are mounted, is disposed in the main frame 10, such that the chassis 40 may be vertically moved. A turntable 42, on which the disc D conveyed into the main frame 10 is located and which is rotated by a spindle motor 41, and an optical pickup unit 43 to record information to the disc located on the turntable 42 or reproduce information stored on the disc are mounted at the chassis 40. The optical pickup unit 43 irradiates light to a recording surface of the disc while moving in the radial direction of the disc. To this end, an optical pickup transferring unit 44, which comprises a screw 44a, a drive motor (not shown), a guide shaft 44b, and a gear (not shown), is mounted at the chassis 40.

A sliding cam 50, which includes a sliding protrusion 51 interacting with a guide groove formed at the lower surface of the tray 20 and a rack gear 52 interacting with the pinion gear 34 of the loading unit 30 is mounted between the chassis 40 and the loading unit 30. The sliding cam 50 is slid from side to side, while the loading/unloading operation of the tray 20 is performed, to guide the vertical movement of the chassis 40.

A plurality of guide rails 11 to guide the sliding movement of the tray 20 are formed at the opposite side parts of the bottom surface of the main frame 10. A plurality of protrusions 12 are formed at the inner surfaces of the opposite sides of the main frame 10.

The optical disc drive, according to embodiments of the present invention, is characterized by a tray holding unit to apply a force to the tray 20, when the loading/unloading operation of the tray 20 is completed, such that the lateral and vertical movement of the tray 20 is restricted. The tray holding unit restrictively biases the movement of the tray, only when the loading/unloading operation of the tray 20 is completed, to prevent shaking of the tray and generation of vibration and noise from the tray. In the movement section of the tray, on the other hand, the tray holding unit allows the tray to move without friction between the components.

To this end, the tray holding unit includes a plurality of catching protrusions 100 formed at the opposite side surfaces of the tray 20 and a plurality of holders 200 formed at the inner surfaces of the opposite sides of the main frame 10, such that the catching protrusions 100 are inserted into the holders 200, respectively, when the loading/unloading operation of the tray 20 is completed, to restrict the upper surfaces and side surfaces of the catching protrusions 100 inserted in the holders 200.

Figure 5A:
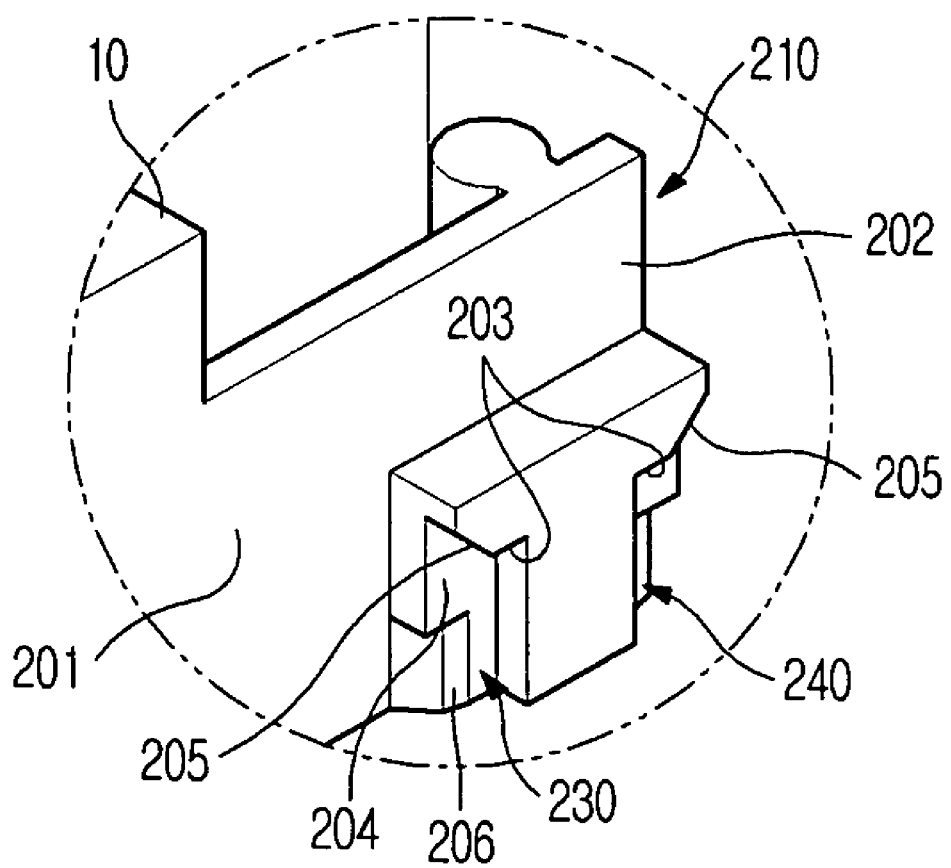
FIGS. 5A and 5B are enlarged perspective views of holders of the optical disc drive of FIG. 4.
Figure 5B:
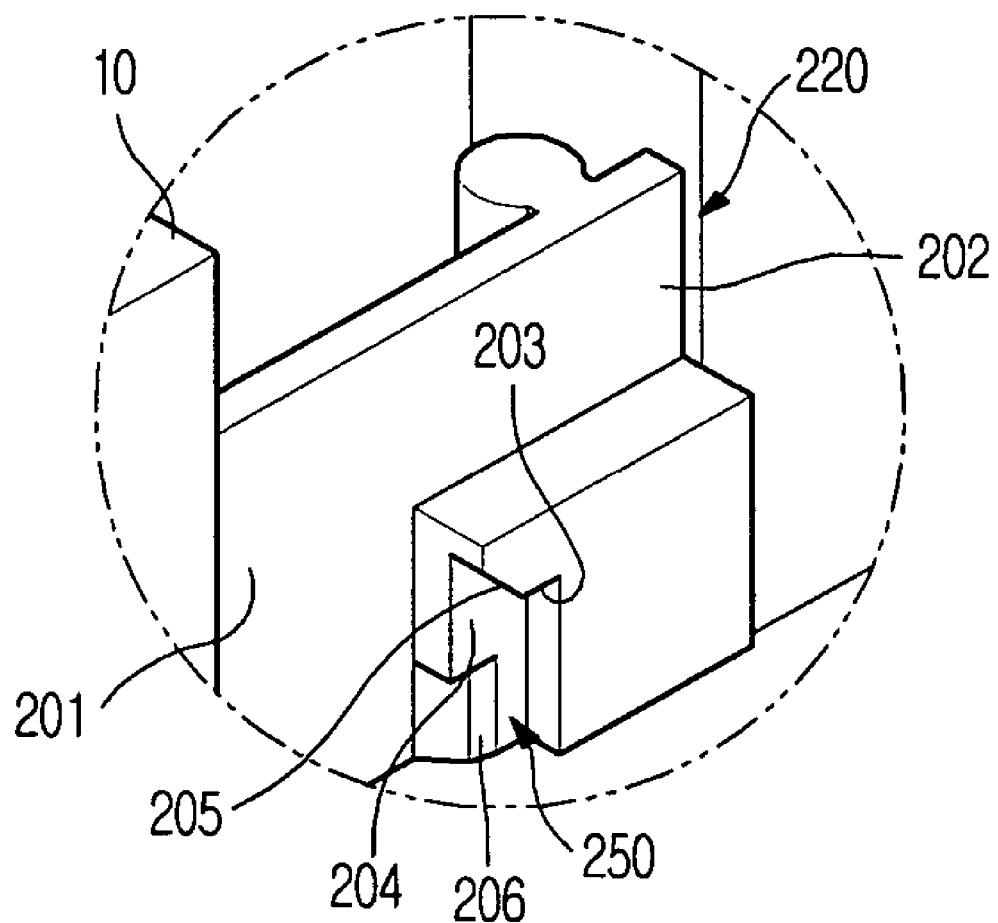
Figure 6A:
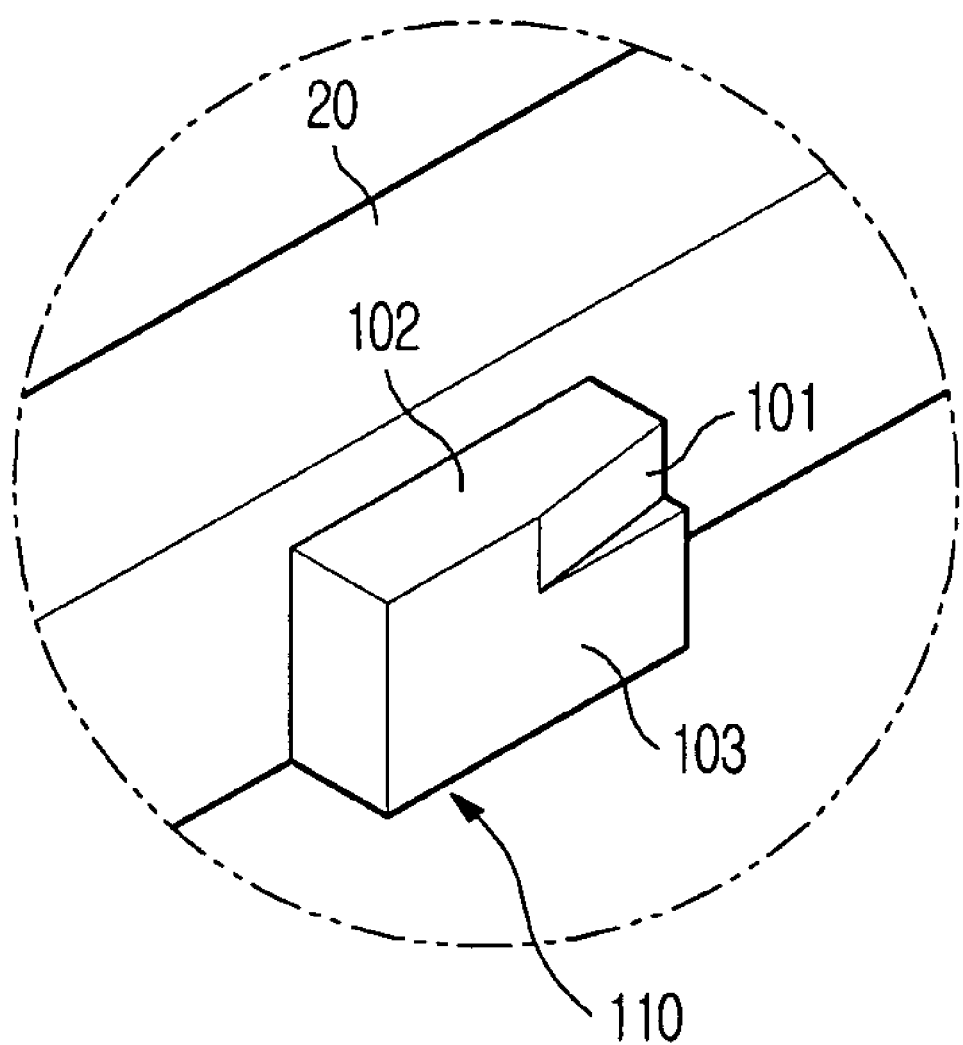
FIGS. 6A and 6B are perspective views of catching protrusions of the optical disc drive of FIG. 4.
Figure 6B:
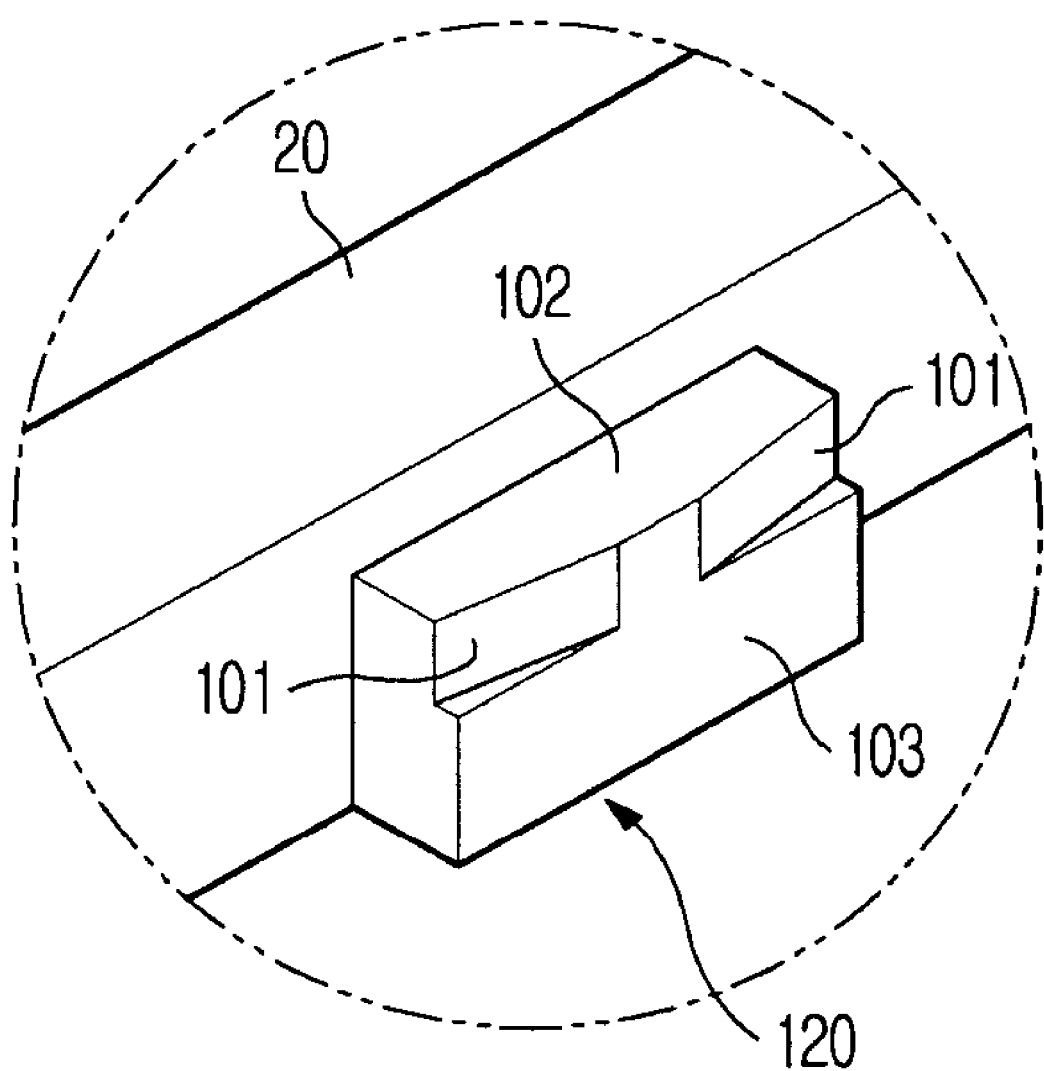

FIGS. 5A and 5B are enlarged perspective views of the holders of the optical disc drive. FIG. 5A illustrates a front holder, and FIG. 5B illustrates a rear holder. FIGS. 6A and 6B are perspective views of the catching protrusions of the optical disc drive. FIG. 6A illustrates a front protrusion, and FIG. 6B illustrates a rear protrusion.

As shown in FIGS. 4, 5A and 5B, the holders 200 are integrally formed with the main frame 10. One end of each holder 200 is a fixed end 201 and the other end of each holder 200 is a free end 202. The free end 202 may be elastically moved. When the catching protrusions 100 are inserted into the holders 200, the free ends 202 of the holders 200 are pushed in the rearward direction to receive the catching protrusions 100. When the insertion of the catching protrusions 100 is completed, the movement of the tray 20 is restricted by the elastic force of the free ends 202.

The holders 200 include front holders 210 disposed at the front parts of the inner surfaces of the opposite sides of the main frame 10 and rear holders 220 disposed at the rear parts of the inner surfaces of the opposite sides of the main frame 10. The front holders 210 restrictively bias the catching protrusions 100 when the loading or unloading operation of the tray 20 is completed, and the rear holders 220 restrictively bias the catching protrusions 100 only when the loading operation of the tray 20 is completed.

The holders 200 have catching grooves 230, 240, and 250, into which the catching protrusions 100 are inserted, respectively. Specifically, the front holders 210 have two symmetrical catching grooves 230 and 240 to restrictively bias the catching protrusions 100 when the loading and unloading operations are performed, and the rear holders 220 have a single catching groove 250 to restrictively bias the catching protrusions 100 only when the loading operation is performed. The shapes of the catching grooves 230, 240, and 250 will be described hereinafter in detail.

As shown in FIGS. 5A and 5B, the catching grooves 230, 240, and 250 have first restricting parts 203 to restrictively bias upper surfaces 102 of the catching protrusions 100 and second restricting parts 204 to restrictively bias side surfaces 103 of the catching protrusions 100. The first restricting parts 203 are configured in the form of catching jaws. The first restricting parts 203 are positioned adjacent to the upper surfaces 102 of the catching protrusions 100, when the catching protrusions 100 are inserted, to prevent the tray 20 from shaking up and down. Similarly, the second restricting parts 203 are positioned adjacent to the side surfaces 103 of the catching protrusions 100, when the catching protrusions 100 are inserted, to prevent the tray 20 from shaking from side to side.

Also, the catching grooves 230, 240, and 250 have first inclined surfaces 205 to guide the upper surfaces of the catching protrusions 100 toward the first restricting parts 203 and second inclined surfaces 206 to guide the side surfaces of the catching protrusions 100 toward the second restricting parts 204. The inclined surfaces enable the upper and side surfaces of the catching protrusions 100 to be smoothly introduced into the first restricting parts 203 and the second restricting parts 204.

In an embodiment of the invention, the second inclined surfaces 206 are partially formed at the catching grooves 230, 240, and 250 along the height of the catching grooves 230, 240, and 250. As a result, the decrease in area of the second restricting parts 204 due to formation of the second inclined surfaces 206 is prevented, and, therefore, when the catching protrusions 100 are inserted, the catching protrusions 100 may be stably restricted in the catching grooves 230, 240, and 250.

As shown in FIGS. 4, 6A and 6B, the catching protrusions 100 include front protrusions 110 and rear protrusions 120, which correspond to the front holders 210 and the rear holders 220, respectively. The front protrusions 110 are inserted into the catching grooves 230 of the front holders 210 when the loading operation of the tray 20 is completed. The rear protrusions 120 are inserted into the catching grooves 250 of the rear holders 220 when the loading operation of the tray 20 is completed, and are inserted into the catching grooves 240 of the front holders 210 when the unloading operation of the tray 20 is completed.

The catching protrusions 100 have guide surfaces 101, by which the side surfaces of the catching protrusions 100 may be smoothly inserted into the catching grooves 230, 240, and 250. The guide surfaces 101 are formed such that the guide surfaces 101 correspond to the regions of the catching grooves where the second inclined surfaces 206 are not formed. The positional relationship between the second inclined surfaces 206 and the guide surfaces 101 may be understood with reference to FIGS. 5A to 6B.

FIGS. 7A to 7D are views illustrating insertion of the catching protrusions into the catching grooves of the optical disc drive according to the present invention. Hereinafter, the operation of the optical disc drive having the tray holding unit with the above-stated construction will be described with reference to FIGS. 4 to 7D.

Figure 7A:
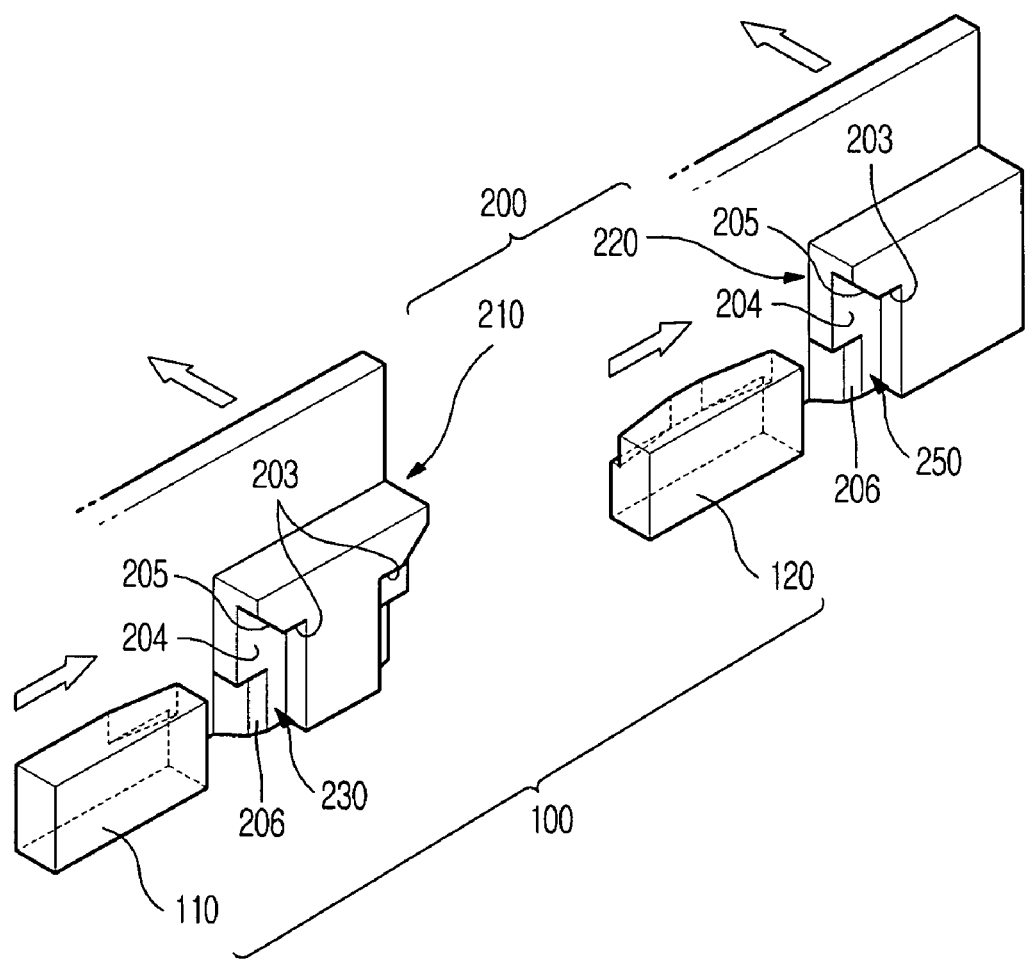
FIGS. 7A to 7D are views illustrating insertion of the catching protrusions into catching grooves of the optical disc drive according to the present invention.
Figure 7B:
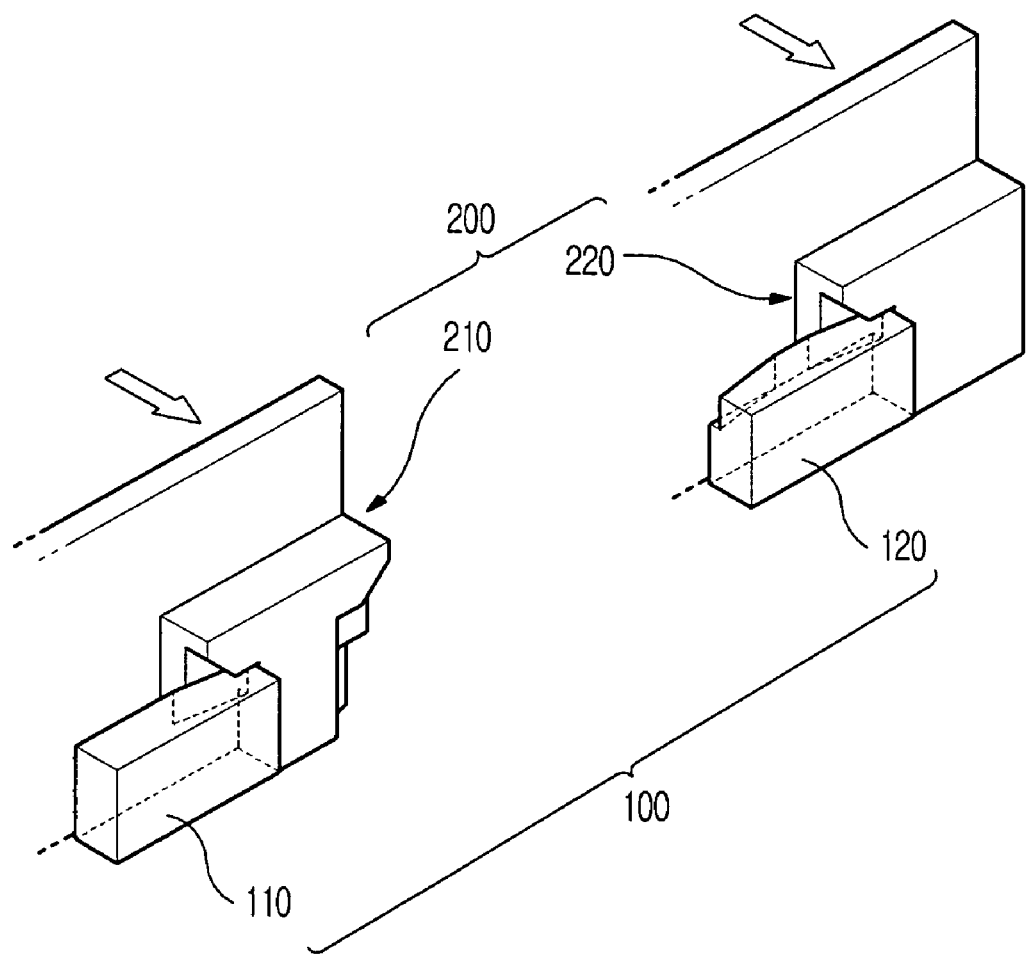

When the disc D is to be loaded, the disc D is located on the tray 20 and the loading motor 31 is rotated. As a result, power is transmitted to the pinion gear 34 via the belt 33 and the pulley 32, and, therefore, the pinion gear 34 is rotated. The rotating force of the pinion gear 34 is transmitted to the rack gear 21 of the tray 20 to cause the tray 20 to be slid into the main frame 10. When the loading operation of the tray 20 is almost completed, as shown in FIGS. 7A and 7B, the front protrusion 110 and the rear protrusion 120 are inserted into the catching groove 230 of the front holder and the catching groove 250 of the rear holder. The catching protrusions 100 are then guided toward the first restricting parts 203 and the second restricting parts 204 via the first inclined surfaces 205 and the second inclined surfaces 206 of the catching grooves 230 and 250. At this time, the holders 200 are elastically deformed in outward directions so as to receive the catching protrusions 100. When the tray 20 is continuously moved to complete the loading operation, the elastic force of the holders 200 is applied to the tray 20. Consequently, the movement of the tray 20 is prevented. When the loading operation of the tray 20 is completed, the guide groove 22 of the tray 20 interacts with the sliding cam 50. As a result, the chassis 40 is moved upward, and, therefore, the disc D is located on the turntable. Consequently, the loading of the disc is completed.

Figure 7C:
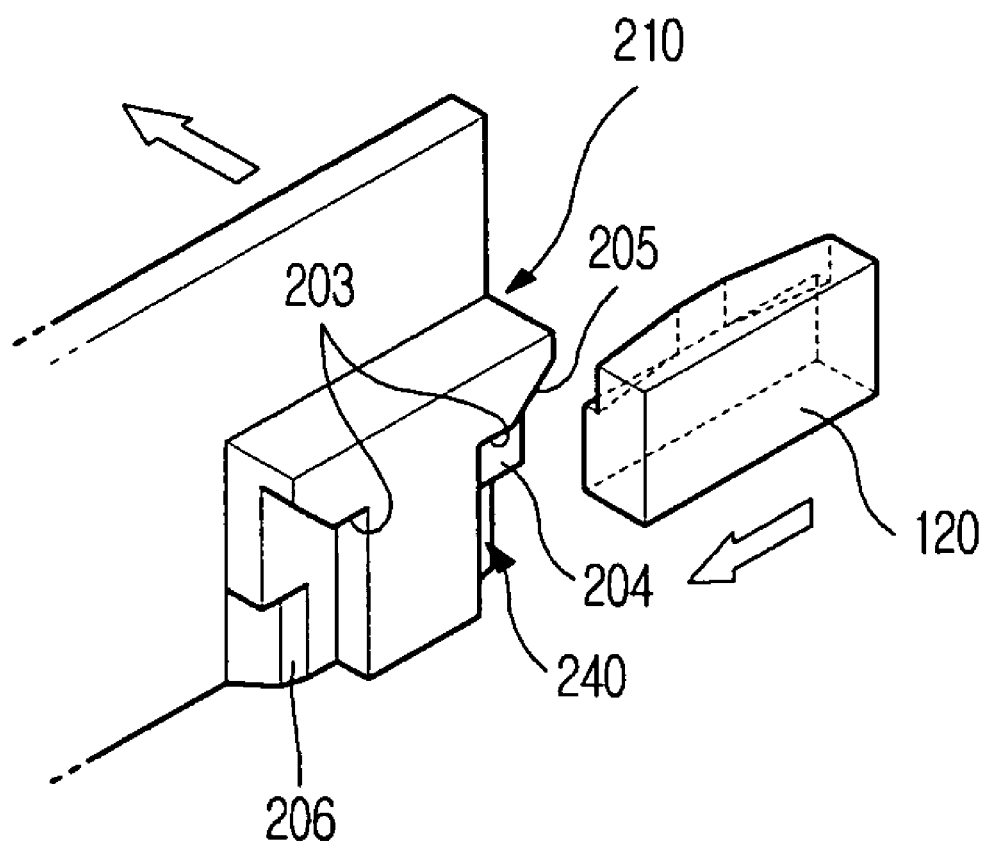
Figure 7D:
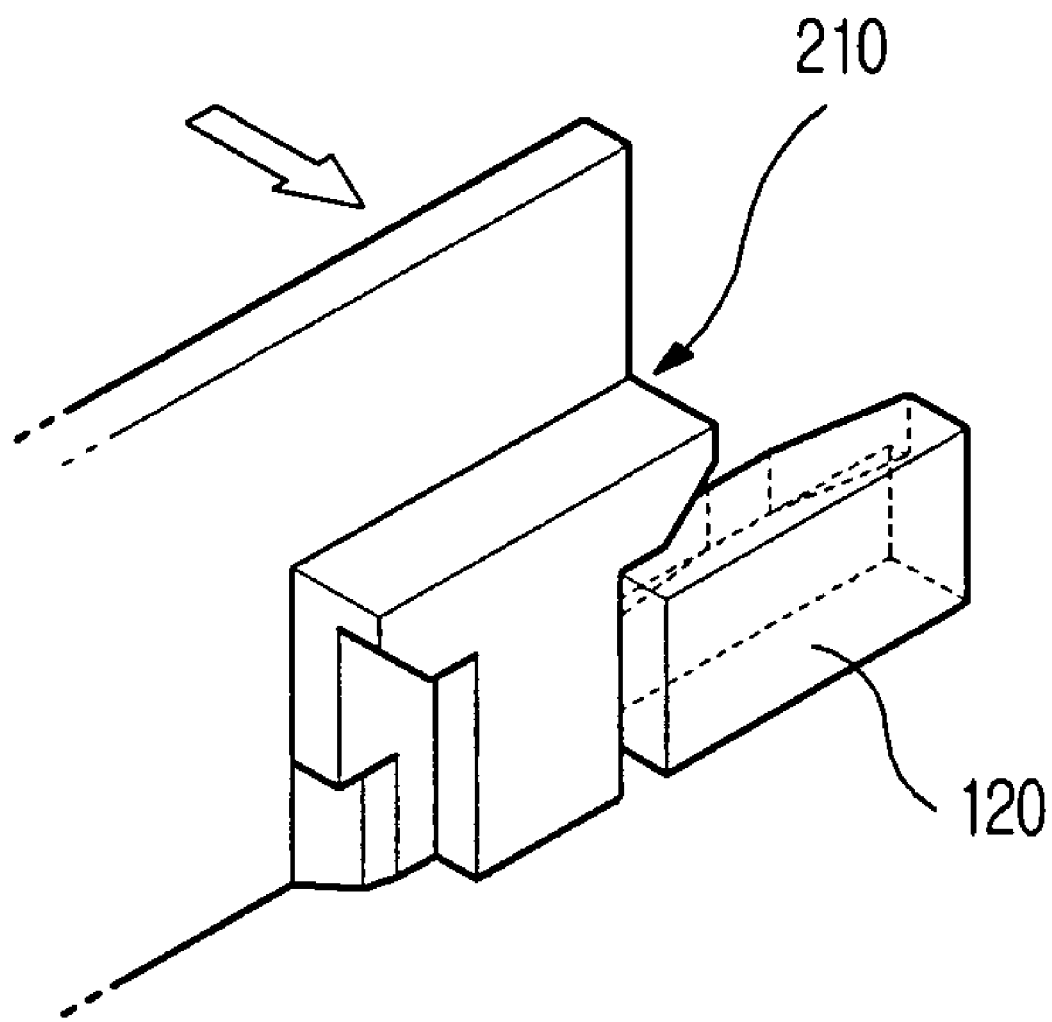

The unloading of the disc is performed in an order that is the reverse of the above. As the loading motor 31 is rotated, the chassis 30 is moved downward, and, therefore, the tray 20 is slid out of the main frame 10. When the unloading operation of the tray 20 is completed, as shown in FIGS. 7C and 7D, the rear protrusion 120 is inserted into the catching groove 240 of the front holder. Consequently, the tray 20 is prevented from shaking from side to side when the sliding movement of the tray 20 is stopped.

As is apparent from the above description, the optical disc drive according to aspects of the present invention includes a tray holding unit to restrictively bias the movement of the tray when the loading/unloading operation of the tray is completed so as to prevent the tray from shaking during the loading or unloading operation of the tray. Consequently, vibration and noise are reduced when the disc is recorded/reproduced after the loading of the disc is completed. Also, the tray, which is visible to consumers when the disc is unloaded, is stably operated without shaking. Therefore, reliability of the product is improved. Furthermore, the tray holding unit, according to aspects of the present invention, presses the tray only when the loading/unloading operation is completed. Consequently, the magnitude of load applied to the loading motor during the loading or unloading operation of the tray is reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical disc drive, comprising:
   a main frame;
   a tray to be inserted into or ejected from the main frame to load or unload a disc; and
   a tray holding unit to bias the tray so as to restrict the vertical and lateral movement of the tray when the loading/unloading of the tray is completed;
   wherein the tray holding unit comprises:
      a plurality of catching protrusions formed at opposite side surfaces of the tray; and
      a plurality of holders formed at the main frame, such that the catching protrusions are inserted into the holders, respectively, when the loading/unloading operation of the tray is completed, to restrictively bias a movement of upper and side surfaces of the catching protrusions inserted in the holders,
   wherein the holders comprise:
      front holders disposed at front parts of the inner surfaces of the opposite sides of the main frame to restrictively bias the corresponding catching protrusions when the loading or unloading operation of the tray is completed;
      rear holders disposed at rear parts of the inner surfaces of the opposite sides of the main frame to restrictively bias the corresponding catching protrusions when the loading operation of the tray is completed; and
      catching grooves into which the catching protrusions are inserted, respectively, wherein the catching grooves comprise:
         first restricting parts to restrictively bias upper surfaces of the catching protrusions; and
         second restricting parts to restrictively bias side surfaces of the catching protrusions.

2. The drive according to claim 1, wherein the catching grooves comprise first inclined surfaces to guide the upper surfaces of the catching protrusions toward the first restricting parts and second inclined surfaces to guide the side surfaces of the catching protrusions toward the second restricting parts.

3. The drive according to claim 2, wherein the second inclined surfaces are partially formed at the catching grooves along a height direction of the catching grooves.

4. The drive according to claim 2, wherein the catching protrusions comprise guide surfaces, by which the side surfaces of the catching protrusions are smoothly inserted into the catching grooves, the guide surfaces being formed such that the guide surfaces correspond to regions of the catching grooves where the second inclined surfaces of the catching grooves are not formed.

5. The drive according to claim 1, wherein the front holders comprise two catching grooves to receive the catching protrusions when the loading or unloading operation of the tray is completed.

6. The drive according to claim 5, wherein the catching protrusions comprise:
   front protrusions to be inserted into the front holders when the loading operation of the tray is completed; and
   rear protrusions to be inserted into the rear holders when the loading operation of the tray is completed and to be inserted into the front holders when the unloading operation of the tray is completed.

7. The drive according to claim 1, wherein the holders are integrally formed with the main frame, and wherein one end of each holder is fixed and the other end of each holder is free such that the holders provide an elastic restrictive bias against movement of the tray.

8. The drive according to claim 1, further comprising:
   guide rails formed at the opposite side parts of the bottom surface of the main frame to guide the sliding movement of the tray during the loading/unloading operation of the tray; and
   protrusions formed at the inner surfaces of the opposite sides of the main frame.

9. An apparatus to prevent a tray from moving in a frame of an optical disc drive once the tray is inserted therein, comprising:
   a plurality of catching protrusions formed at opposite side surfaces of the tray; and
   a plurality of holders formed at the frame, such that the catching protrusions are inserted into the holders, respectively, when the loading/unloading operation of the tray is completed, to restrictively bias a movement of upper and side surfaces of the catching protrusions inserted in the holders,
   wherein the holders comprise:
      front holders disposed at front parts of inner surfaces of the opposite sides of the main frame to restrictively bias the corresponding catching protrusions when the loading or unloading operation of the tray is completed;
      rear holders disposed at rear parts of the inner surfaces of the opposite sides of the main frame to restrictively bias the corresponding catching protrusions when the loading operation of the tray is completed; and
      catching grooves, into which the catching protrusions are inserted, respectively, and wherein the catching grooves comprise:
         first restricting parts to restrictively bias upper surfaces of the catching protrusions; and
         second restricting parts to restrictively bias side surfaces of the catching protrusions.

10. The apparatus according to claim 9, wherein the catching grooves comprise first inclined surfaces to guide the upper surfaces of the catching protrusions toward the first restricting parts and second inclined surfaces to guide the side surfaces of the catching protrusions toward the second restricting parts.

11. The apparatus according to claim 10, wherein the second inclined surfaces are partially formed at the catching grooves along a height direction of the catching grooves.

12. The apparatus according to claim 9, wherein the front holders comprise two catching grooves to each receive the catching protrusions when the loading or unloading operation of the tray is completed.

13. The apparatus according to claim 12, wherein the catching protrusions comprise:
   front protrusions to be inserted into the front holders when the loading operation of the tray is completed; and
   rear protrusions to be inserted into the rear holders when the loading operation of the tray is completed and to be inserted into the front holders when the unloading operation of the tray is completed.

14. The drive according to claim 13, wherein the catching protrusions comprise guide surfaces, by which the side surfaces of the catching protrusions are smoothly inserted into the catching grooves, the guide surfaces being formed to correspond to regions of the catching grooves where the second inclined surfaces of the catching grooves are not formed.

15. The drive according to claim 9, wherein the holders are integrally formed with the main frame, and wherein one end of each holder is fixed and the other end of each holder is free such that the holders provide an elastic restrictive bias against movement of the tray.

* * * * *